United States Patent
Albertelli et al.

(10) Patent No.: US 11,413,486 B2
(45) Date of Patent: Aug. 16, 2022

(54) GAS-PRODUCING MATERIAL

(71) Applicant: Acell Industries Limited, Cork (IE)

(72) Inventors: Aldino Albertelli, Cork (IE); Michael Frieh, Cork (IE)

(73) Assignee: Acell Industries Limited, Cork (IE)

( * ) Notice: Subject to any disclaimer, the term of this patent is extended or adjusted under 35 U.S.C. 154(b) by 613 days.

(21) Appl. No.: 15/751,501

(22) PCT Filed: Aug. 10, 2016

(86) PCT No.: PCT/GB2016/052491
§ 371 (c)(1),
(2) Date: Feb. 9, 2018

(87) PCT Pub. No.: WO2017/025749
PCT Pub. Date: Feb. 16, 2017

(65) Prior Publication Data
US 2018/0229063 A1 Aug. 16, 2018

(30) Foreign Application Priority Data

Aug. 10, 2015 (GB) .................................... 1514106

(51) Int. Cl.
| | |
|---|---|
| *A62D 1/06* | (2006.01) |
| *C06B 23/02* | (2006.01) |
| *C06D 5/06* | (2006.01) |
| *C09K 21/10* | (2006.01) |
| *C06B 31/02* | (2006.01) |

(52) U.S. Cl.
CPC ................ *A62D 1/06* (2013.01); *C06B 23/02* (2013.01); *C06B 31/02* (2013.01); *C06D 5/06* (2013.01); *C09K 21/10* (2013.01)

(58) Field of Classification Search
None
See application file for complete search history.

(56) References Cited

U.S. PATENT DOCUMENTS

| | | | | |
|---|---|---|---|---|
| 4,233,199 A | * | 11/1980 | Abolins | C08K 3/36 |
| | | | | 524/139 |
| 4,402,364 A | * | 9/1983 | Klein | A62D 1/00 |
| | | | | 169/47 |
| 4,595,710 A | * | 6/1986 | Albertelli | C08J 9/0061 |
| | | | | 521/100 |
| 4,999,383 A | | 3/1991 | Blount | |
| 5,831,209 A | | 11/1998 | Kozyrev et al. | |
| 9,227,098 B2 | * | 1/2016 | Van Der Jagt | A62D 1/06 |
| 2014/0041882 A1 | | 2/2014 | Van Der Jagt | |
| 2014/0352988 A1 | | 12/2014 | Albertelli et al. | |

FOREIGN PATENT DOCUMENTS

| | | |
|---|---|---|
| EP | 0222298 | 5/1987 |
| EP | 0794164 | 9/1997 |
| EP | 0804946 | 11/1997 |
| WO | 2012112037 | 8/2012 |

OTHER PUBLICATIONS

GB Search Report dated Feb. 5, 2016.
International Search Report dated Nov. 10, 2016.
GB Examination Report dated Jul. 27, 2020 for App. No. GB1514106.2.

\* cited by examiner

*Primary Examiner* — Aileen B Felton
(74) *Attorney, Agent, or Firm* — Ryan T. Grace; Advent, LLP

(57) ABSTRACT

The present invention relates to gas-producing materials, methods of forming gas-producing materials, and uses of gas-producing materials. The gas-producing materials comprise a comminuted foamed polymer, a nitrogen-containing fuel and an oxidiser. The gas-producing materials may be used to suppress a fire.

21 Claims, No Drawings

GAS-PRODUCING MATERIAL

The present invention relates to gas-producing materials, methods of forming gas-producing materials, and uses of gas-producing materials. The gas-producing materials comprise a comminuted foamed polymer, a nitrogen-containing fuel and an oxidiser. The gas-producing materials may be used to suppress a fire.

Fires can be controlled with passive fire protection and active fire protection.

Passive fire protection can be built into the structure of a building so as to minimise spread of a fire through the building, as well as the impact of the fire on the structural integrity of the building. For instance, to reduce the likelihood of a fire spreading, a building may be compartmentalised using fire resistant walls and doors. Structural steel may be coated with a material to prevent the steel from reaching temperatures at which it starts to soften. Passive fire protection has the advantage that it does not rely on any external factors to be effective. However, passive fire protection is by its nature limited in the extent to which it works to extinguish a fire.

Active fire protection, however, does rely on external factors to be effective, such as human input or a trigger. Hand-held fire extinguishers are an example of active fire protection. Generally, hand-held fire extinguishers contain a propellant and a fire supressing agent. Fire suppressing agents include water; dry chemical materials such as monoammonium phosphate, sodium bicarbonate, potassium bicarbonate and potassium chloride; carbon dioxide; foams such as aqueous film forming foam (AFFF), alcohol-resistant aqueous film forming foams (AR-AFFF) and compressed air foam systems (OAFS); wet chemical materials such as potassium acetate, potassium carbonate and potassium citrate; and Halon gas. Halon gas has now been banned from use in Europe due to its adverse effects on both humans and the environment.

Hand-held fire extinguishers have the disadvantage that they generally require a person to be in close proximity to naked flames which may compromise personal safety. For water-, dry chemical- and Halon-based fire extinguishers, the horizontal range is typically between 3 and 50 ft. Fire extinguishers which have higher horizontal ranges require much heavier canisters of between 75 and 350 lbs. Such fire extinguishers are transported on wheels and so are not easily manoeuvred in the event of a fire.

Sprinklers (both water and gas) are a further example of active fire protection. When a certain temperature is reached around a sprinkler, a thermal-sensor activates the sprinkler to deploy water or gas. Depending on the type of sprinkler, the temperature at which the thermal-sensor activates the sprinkler can vary from 38° C. to 330° C. A disadvantage of sprinklers is that they require a relatively large infrastructure to function. For example, sprinklers need to be connected to a gas or water supply which, in itself, may require large storage areas. A further problem with sprinklers is that a time lag, which can be of up to two minutes, between activation of the sprinkler and water or gas deployment leads to the loss of valuable time for suppressing a fire.

Fires can also be controlled using gas-producing materials which burn to produce aerosol products with an extinguishing effect. Such materials are stable at room temperature but may be triggered to combust by heat, such as the heat produced by a fire. The materials have advantages associated with passive fire protection as they do not necessarily rely on any external triggers to be effective, yet also have advantages associated with active fire protection as they work to extinguish a fire.

WO 92/17244 discloses a method for obtaining a fire extinguishing material in which potassium nitrate, iditol and dicyandiamide are mixed and pressed to form a charge.

Along similar lines, U.S. Pat. No. 5,831,209 discloses a composition for extinguishing fires which comprises potassium nitrate, phenolformaldehyde resin and dicyanamide (also known as cyanoguanidine). The composition is prepared by mixing a solution of phenolformaldehyde with the other components, and subsequently granulating and drying the composition until a residual content of moisture and volatile constituents of not more than 1% is present. Thus the phenolformaldehyde resin component of the composition only becomes a solid material once it has been mixed with the potassium nitrate and dicyanamide and then cured. However, such materials suffer from inconsistent burn as high homogeneniality is required of the resin and catalyst used for curing.

EP 0976424 represents the closest prior art to the present invention. This document discloses a method for preparing a composition for extinguishing fires which comprises mixing a combustible binder either in an ethanol solution or in the form of a powder having a specifically selected ratio of particle sizes, with an oxidizing agent having a specifically selected ratio of particle sizes and a gas-aerosol-forming agent having a specifically selected ratio of particle sizes. The composition is subsequently moulded. According to the method, the large sized particles of the combustible binder, oxidizing agent and gas-aerosol-forming agent are mixed, and subsequently the small-sized fractions are added. The combustion temperatures of these compositions are intentionally low, and range from 640 to 750° C. In addition only very low amounts of moisture should be present, i.e. less than 1 wt. % with less than 0.1 wt. % being exemplified.

Known gas-producing materials have the disadvantage that, on combustion, they emit unwanted by-products which may be damaging to human health. Such by-products may not be present in the composition but form and are emitted on combustion due to the temperatures that develop as a result of exothermic reactions taking place in the material. When a gas-producing material is used to control a fire in a small space, such as an office or a car, unwanted by-products can rapidly build-up. This has limited the quantity of gas-producing material that may be used to control a fire in small spaces.

A typical unwanted by-product generated by known gas-producing materials is hydrogen cyanide. In the case of hydrogen cyanide, inhalation by humans at concentrations of 150 mg/m$^3$ is believed to cause death within 30 minutes, at concentrations of 200 mg/m$^3$ is believed to cause death within 10 minutes, and at concentrations of 300 mg/m$^3$ is believed to cause immediate death. The current legal limit in the UK for gaseous hydrogen cyanide concentration is 55 mg/m$^3$.

Other by-products that may be generated include: carbon monoxide, nitrogen dioxide, oxygen, sulfur dioxide, hydrogen sulfide, ammonia, naphthalene, acenaphthylene, acenaphthene, fluorene, phenanthrene, anthracene, fluoranthene, pyrene, benzoanthracenes, chrysene, benzofluoranthenes, benzopyrenes, perylene, indenopyrenes, dibenzanthracenes and benzoperylenes.

In order that greater quantities of gas-producing material may be used to control a fire in a confined space, the emission of unwanted by-products, such as hydrogen cyanide, must be minimised.

The present invention provides a method of forming a gas-producing material, the method comprising comminuting a foamed polymer to form a comminuted foamed polymer and combining the comminuted foamed polymer with a nitrogen-containing fuel and an oxidiser.

The present invention also provides a gas-producing material comprising:
(i) a comminuted foamed polymer;
(ii) a nitrogen-containing fuel; and
(iii) an oxidiser.

The gas-producing material may be obtainable by the method of the present invention.

The gas-producing materials of the present invention have been found to produce less cyanide than known gas-producing materials. Without wishing to be bound by any theory, it is believed that this effect is due to the use of a comminuted foamed polymer, rather than an unfoamed polymer, in the gas-producing materials of the invention. A higher temperature of combustion has been observed upon combustion of the gas-producing materials of the present invention, as compared to known gas-producing materials.

In addition, the gas-producing materials of the present invention have been found to burn more consistently, with the avoidance of extreme reactions such as localised explosions. Without wishing to be bound by any theory, it is believed that the use of a pre-cured resinous material avoids issues caused by partial curing of resinous materials contained in traditional materials. Pre-curing also allows for better control of water content of the present invention, as curing of resinous materials can lead to the formation of significant amounts of water as a by-product.

In known gas producing compositions, the resinous material is cured in situ by way of a catalyst such as PTSA (p-toluene sulphonic acid) or the like. However, gas producing compositions such as those of the prior art and the present invention comprise a range of basic components, which can cause neutralization of the acid catalyst. In this way, in the prior art compositions, there is insufficient catalyst available for full and proper curing of the resinous material.

It will also be appreciated, that this problem can be further exasperated due to poor control of other reaction parameters such as homogeneity, moisture and/or temperature.

The resinous material plays a critical part in the formation of gas by the gas-producing material and thus insufficient curing will inherently result in there being insufficient material for efficient combustion of the gas-producing material.

Thus, the present invention provides a method of suppressing a fire comprising use of the gas-producing material of the present invention, as well as the use of such materials for suppressing a fire.

Also provided is the use of a comminuted foamed polymer for reducing cyanide emissions from a gas-producing material comprising a nitrogen-containing fuel and an oxidiser.

In addition, there is also provided the use of a comminuted foamed polymer for increasing the burn temperature of a gas-producing material comprising a nitrogen-containing fuel and an oxidiser.

The materials of the present invention are able to generate temperatures of 1000 to 1300° C. upon combustion, in contrast to the lower burning temperatures of the known prior art compositions.

The comminuted foamed polymer may be selected from phenolic resin foams, polystyrene foams, polyurethane foams, polyethylene foams, polyvinylchloride foams, polyvinylacetate foams, polyester foams polyether foams, and foam rubber. Preferably, the polymeric foam is selected from phenolic resin foams.

According to the present invention, the comminuted foamed polymer is formed by comminuting a foamed polymer. The foamed polymer is preferably a substantially rigid and self-supporting foamed polymer. The foamed polymer is preferably a cured foamed polymer, and most preferably a phenolic foam.

The foamed polymer preferably has a density in the range of 100 to 500 $kg \cdot m^{-3}$, more preferably 120 to 400 $kg \cdot m^{-3}$, and most preferably 120 to 250 $kg \cdot m^{-3}$, exclusive of any aggregate chips that may be embedded in the substrate.

The foamed polymer may have a tensile strength in the range of 80 to 100 $N/m^2$.

Preferably, the average cell diameter of the foamed polymer is in the range of about 0.5 mm to 5 mm, more preferably 0.5 or 1 mm to 2 or 3 mm.

The foamed polymer may be open-cell or closed-cell, but is preferably open-cell.

In one embodiment, the present invention further comprises forming the foamed polymer by a curing reaction between:
(a) a liquid resole; and
(b) an acid hardener for the resole.

An insoluble particulate solid is preferably also present in the curing reaction.

As mentioned above, a particularly suitable solid open-cell foam is a solid open-cell phenolic resin foam. Thus, the resole is preferably a phenolic resole.

A preferred foamed polymer may be produced by way of a curing reaction between:
(a) a liquid phenolic resole having a reactivity number (as defined below) of at least 1; and
(b) a strong acid hardener for the resole; optionally in the presence of:
(c) a finely divided inert and insoluble particulate solid which is present, where used, in an amount of at least 5% by weight of the liquid resole and is substantially uniformly dispersed through the mixture containing resole and hardener;
the temperature of the mixture containing resole and hardener due to applied heat not exceeding 85° C. and the said temperature and the concentration of the acid hardener being such that compounds generated as by-products of the curing reaction are volatilised within the mixture before the mixture sets such that a foamed phenolic resin product is produced.

By a phenolic resole is meant a solution in a suitable solvent of an acid-curable prepolymer composition prepared by condensation of at least one phenolic compound with at least one aldehyde, usually in the presence of a catalyst. The catalysts may be an alkaline catalyst such as sodium hydroxide.

Examples of phenols that may be employed are phenol itself and substituted, usually alkyl substituted, derivatives thereof, with the condition that that the three positions on the phenolic benzene ring ortho- and para- to the phenolic hydroxyl group are unsubstituted. Mixtures of such phenols may also be used. Mixtures of one or more than one of such phenols with substituted phenols in which one of the ortho- or para-positions has been substituted may also be employed where an improvement in the flow characteristics of the resole is required. However, in this case the degree of cross-linking of the cured phenolic resin foam will be reduced. Phenol itself is generally preferred as the phenol component for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active hydrogen atoms (dihydric compound) that will react with the phenol/aldehyde reaction product of the resole during the curing step to reduce the density of cross-linking. Preferred dihydric compounds are diols, especially alkylene diols or diols in which the chain of atoms between the hydroxy groups contains not only methylene and/or alkyl-substituted methylene groups but also one or more heteroatoms, especially oxygen atoms. Suitable diols include ethylene glycol, propylene glycol, propane-1,3-diol, butane-1, 4-diol and neopentyl glycol. Particularly preferred diols are poly-, especially di-,(alkylene ether) diols, for example diethylene glycol and, especially, dipropylene glycol.

Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2 to 6 atoms between hydroxy groups.

The resole may comprise a solution of the phenol/aldehyde reaction product in water or in any other suitable solvent or in a solvent mixture, which may or may not include water.

Where water is used as the sole solvent, it is preferably present in an amount of from 15 20 to 35% by weight of the resole, preferably 20 to 30%. Of course the water content may be substantially less if it is used in conjunction with a cosolvent, e.g. an alcohol or one of the above-mentioned dihydric compounds where used.

As indicated above, the liquid resole (i.e. the solution of phenol/aldehyde product 25 optionally containing dihydric compound) must have a reactivity number of at least 1. The reactivity number is 10/x where x is the time in minutes required to harden the resole using 10% by weight of the resole of a 66 to 67% aqueous solution of p-toluene sulfonic acid at 60° C. The test involves mixing about 5 mL of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulfuric acid and phosphoric acid, and strong organic acids such as aromatic sulfonic acids, e.g. toluene sulfonic acids, and trichloroacetic acid. Weak acids such as acetic acid and propionic acid are generally not suitable. The preferred hardeners for the process of the invention are the aromatic sulfonic acids, especially toluene sulfonic acids. The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5 to 20 poises. Below 5 poises, the amount of solvent present tends to present difficulties during the curing reaction.

The curing reaction is exothermic and will therefore of itself cause the temperature of the mixture containing resole and acid hardener to increase. The temperature of the mixture may also be raised by applied heat, but the temperature to which said mixture may then be raised (that is, excluding the effect of any exotherm) preferably does not exceed 85° C. If the temperature of the mixture exceeds 85° C. before addition of the hardener, it is usually difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range usually depends to some extent on the nature of the particulate solid, where used. For most solids the preferred temperature range is from 25 to 65° C., but for some solids, in particular wood flour and grain flour, the preferred temperature range is 25 to 75° C. The most preferred temperature range is 30 to 50° C. Temperatures below ambient, e.g. down to 10° C. can be used if desired, but no advantage is usually gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition, but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build-up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole, assuming that the resole has a substantially neutral reaction, i.e. a pH of about 7. By equivalent to p-toluene sulfonic acid, we mean the amount of hardener required to give substantially the same curing time as the stated amount of p-toluene sulfonic acid. The most suitable amount for any given temperature and combination of resole and finely divided solid is readily determinable by simple experiment. Where the preferred temperature range is 25 to 75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

By suitable control of the temperature and of the hardener concentration, the time lapse between adding the hardener to the resole and the composition becoming hard (referred to herein as the curing time) can be varied at will from a few seconds to up to an hour or even more, without substantially affecting the density and cell structure of the product.

Another factor that controls the amount of hardener required can be the nature of the inert solid, where present. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily formaldehyde and/or water, present in the resole and/or generated by the curing action, and provides sites at which bubble formation is promoted, thereby assisting uniformity of pore size. The presence of the finely divided solid may also promote stabilisation of the individual bubbles and reduce the tendency of bubbles to agglomerate and eventually cause likelihood of bubble collapse prior to cure. To achieve the desired effect, the solid should be present in an amount of not less than 5% by weight based on the weight of the resole.

Any finely divided particulate solid that is insoluble in the reaction mixture is suitable, provided it is inert. Examples of suitable particulate solids are provided above, and also include alumina.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it will be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

Other additives may be included in the foam-forming mixture. These may include: (i) surfactants, such as anionic materials, e.g. sodium salts of long chain alkyl benzene sulfonic acids, non-ionic materials such as those based on poly(ethyleneoxide) or copolymers thereof, and cationic materials such as long chain quaternary ammonium compounds or those based on polyacrylamides; (ii) viscosity modifiers such as alkyl cellulose, especially methyl cellulose; and (iii) colorants, such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols. Polymerisable unsaturated compounds may also be included, possibly together with free-radical polymerisation initiators that are activated during the curing reaction, e.g. acrylic monomers, so-called urethane acrylates, styrene, maleic acid and derivatives thereof, and mixtures thereof. The foam-forming compositions may also contain dehydrators, if desired.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc. Conventional blowing agents may also be included to enhance the foaming reaction, e.g. low boiling organic compounds or compounds which decompose or react to produce gases.

The foamed polymer may comminuted by any known method. For instance, the foamed polymer may be comminuted using a grinding mill, such as a ball mill.

The comminuted foamed polymer which is used in the present invention may have an average particle size in the range of 1 to 200 μm, such as 10 to 150 μm, and preferably 25 to 100 μm.

In one embodiment, the foamed polymer is comminuted and the resulting product is used directly, for instance without further processing, for forming the gas-producing material.

In an alternative embodiment, only those particles having an average particle size in the range of 1 to 200 μm, such as 10 to 150 μm, and preferably 25 to 100 μm are used for forming the gas-producing material.

The comminuted foamed polymer may be provided in the method of the invention and present in the gas-producing material in an amount of up to 40%, typically of 5 to 35%, by total weight of the comminuted foamed polymer, the nitrogen-containing fuel and the oxidiser. In certain embodiments, the comminuted foamed polymer is present in an amount of 8 to 20%, more preferably of 11 to 17%, and still more preferably of 13 to 15%, by total weight of the comminuted foamed polymer, the nitrogen-containing fuel and the oxidiser.

The nitrogen-containing fuel used in the present invention may be selected from guanidine salts or derivatives, triazoles and tetrazoles and azo-compounds. Suitable guanidine salts or derivates may be selected from cyanoguanidine, aminoguanidine, aminoguanidine nitrate, guanidine nitrate, triaminoguanidine nitrate, diaminoguanidine nitrate and ethylenebis-(aminoguanidinium)dinitrate. Suitable triazoles and tetrazoles include unsubstituted tetrazole and 5-aminotetrazole. Suitable azo-compounds include azodicarbonate and azodicarbonamide.

The nitrogen-containing fuel is preferably a guanidine salt or derivative, and most preferably cyanoguanidine. Advantageously, guanidine salts or derivatives act as a binder for the gas-producing material of the present invention, as well as having the function of a fuel.

The nitrogen-containing fuel may be provided in the method of the invention and present in the gas-producing material in an amount of up to 50%, typically of 5 to 45%, by total weight of the comminuted foamed polymer, the nitrogen-containing fuel and the oxidiser. In certain embodiments, the nitrogen-containing fuel is present in an amount of 19 to 29%, more preferably of 21 to 27%, and still more preferably of 23 to 25%, by total weight of the comminuted foamed polymer, the nitrogen-containing fuel and the oxidiser.

The nitrogen-containing fuel may be provided in the method of the invention and present in the gas-producing material in the form of particles with an average particle size in the range of from 5 to 150 μm, preferably 10 to 80 μm, more preferably 20 to 50 μm.

Alternative, the nitrogen-containing fuel may be used in the method of the invention in the form of granules which are then comminuted, for instance with the foamed polymer, into particles. The nitrogen-containing fuel may be comminuted into particles with an average particle size in the range of from 5 to 150 μm, preferably 10 to 80 μm, more preferably 20 to 50 μm.

The oxidiser used in the present invention may be selected from alkali metal nitrates, perchlorates or carbonates. The alkali metal in the oxidiser will generally be sodium or potassium. The oxidiser may be potassium nitrate or potassium carbonate, and is preferably potassium nitrate. The use of potassium nitrate is preferred as its combustion temperature (approximately 150° C.)—i.e. the temperature at which it starts burning—is much lower than that of potassium carbonate (approximately 300° C.).

The oxidiser may be provided in the method of the invention and present in the gas-producing material in an amount of up to 80%, typically of 30 to 75%, by total weight of the comminuted foamed polymer, the nitrogen-containing fuel and the oxidiser. In certain embodiments, the oxidiser is present in an amount of 55 to 69%, more preferably of 58 to 66%, and still more preferably of 60 to 64%, by total weight of the comminuted foamed polymer, the nitrogen-containing fuel and the oxidiser.

The oxidiser may be provided in the method of the invention and present in the gas-producing material in the form of particles with an average particle size in the range of from 1 to 100 μm, preferably 5 to 50 μm, more preferably 15 to 30 μm. Alternative, the oxidiser may be used in the method of the invention in the form of granules which are then comminuted, for instance with the foamed polymer, into particles. The oxidiser may be comminuted into particles with an average particle size in the range of from 1 to 100 μm, preferably 5 to 50 μm, more preferably 15 to 30 μm.

For the avoidance of doubt, it will be appreciated that each of the components of the present invention, i.e. the comminuted foamed polymer, the nitrogen-containing fuel and the oxidiser, are different compounds. Thus, a single compound cannot correspond to more than one of these components.

The method of the present invention preferably comprises combining:
 the comminuted foamed polymer in an amount of 8 to 20%;
 the nitrogen-containing fuel in an amount of 19 to 29%; and
 the oxidiser in an amount of 55 to 69%,
by total weight of the comminuted foamed polymer, the nitrogen-containing fuel and the oxidiser.

More preferred is to combine:
 the comminuted foamed polymer in an amount of 11 to 17%;
 the nitrogen-containing fuel in an amount of 21 to 27%; and
 the oxidiser in an amount of 58 to 66%,
by total weight of the comminuted foamed polymer, the nitrogen-containing fuel and the oxidiser.

Still more preferred is to combine:
the comminuted foamed polymer in an amount of 13 to 15%;
the nitrogen-containing fuel in an amount of 23 to 25%; and
the oxidiser in an amount of 60 to 64%,
by total weight of the comminuted foamed polymer, the nitrogen-containing fuel and the oxidiser.

In a specific instance, the comminuted foamed polymer is present in an amount of 14%, the nitrogen-containing fuel is present in an amount of 24%, and the oxidiser is present in an amount of 62%, by total weight of the comminuted foamed polymer, the nitrogen-containing fuel and the oxidiser.

As will be appreciated, the amounts of comminuted foamed polymer, oxidiser and nitrogen-containing fuel used in the method of the present invention correspond to the amounts of these components in the final product. Although a range of materials may be used, the comminuted foamed polymer is preferably a phenolic resin, the nitrogen-containing fuel is preferably a guanidine salt or derivative such as cyanoguanidine, and the oxidiser is preferably potassium nitrate.

The comminuted foamed polymer, nitrogen-containing fuel and oxidiser may be combined to form the gas-producing material by means of known methods, such as mixing, for instance, with a blade mixer. The components may be combined in one step, or two of the components may be combined and subsequently added to the third component. For instance, the nitrogen-containing fuel and the oxidiser may be combined, and then added to the comminuted foamed polymer.

The method of the present invention may further comprise moulding the gas-producing material into unit blocks. Preferably, the units have a size of from 10 g to 10 kg, such as from 20 g to 1 kg.

The gas-producing material may be moulded into any shape, such as a cylinder or a pellet. Where the gas-producing material is in pellet/particulate form, it will be appreciated that the pellets/particles formed may be incorporated into a polymer matrix. Such a polymer matrix may be used to form polymeric structures such as sheets having gas-producing pellets/particles dispersed throughout therein.

The method of the present invention may further comprise pressing the gas-producing material so as to compact the components. The gas-producing material is preferably subjected to a pressure of from 1 M Pa to 200 M Pa, such as from 20 M Pa to 150 M Pa.

The method of the present invention may comprise combining water with the comminuted foamed polymer, the nitrogen-containing fuel and the oxidiser so as to form a paste. The water may be added with the comminuted foamed polymer, the nitrogen-containing fuel and/or the oxidiser, or it may be added once two or all of these components have already been combined. In one embodiment, the water is combined with the comminuted foamed polymer before the nitrogen-containing fuel and the oxidiser are added.

The water will generally be added in an amount of from 1 to 100%, preferably 5 to 50%, and more preferably 10 to 30%, by total weight of the comminuted foamed polymer, the nitrogen-containing fuel and the oxidiser. More water than is desired in the gas-producing material may be added during formation of the gas-producing material, as water can assist with binding of the components.

The method may further comprise drying the paste, for instance until water is present in an amount of less than of less than 50%, for instance of 1 to 40%, preferably 3 to 30%, and more preferably 5 to 20%, by total weight of the comminuted foamed polymer, the nitrogen-containing fuel and the oxidiser. This amount of water advantageously minimises the risk of un-triggered explosion arising from the use of a comminuted polymer, yet surprisingly does not prevent triggered combustion of the gas-producing materials of the invention.

The drying may be carried out at a temperature of from 25 to 110° C., preferably 40 to 90° C., more preferably 60 to 80° C. using any conventional technique. For instance, the drying may take place in drying oven. Alternatively, air may simply be circulated around the gas-producing material. The drying of the gas-producing material will usually take from 10 minutes to 24 hours. In one embodiment, the gas-producing material may be simultaneously dried and compressed by being passed through heated rollers.

In addition to the main components of the gas-producing material (i.e. the comminuted foamed polymer, the nitrogen-containing fuel and the oxidiser), the gas-producing material may comprise further components such as binders, oxide-based catalysts, burn rate modifiers, flame inhibition chemicals, anti-detonation components and/or additional oxidizing agents. However, in certain instances, it is preferred that the gas-producing material consists only of the comminuted foamed polymer (e.g. a comminuted phenolic resin foam), the nitrogen-containing fuel (e.g. a guanidine salt or derivative), the oxidiser (e.g. a sodium or potassium nitrate or carbonate) and water.

It will be appreciated that minor amounts of other binders may also be present, such as water-soluble organic binders. Suitable binders include guar gums, polyvinylpyrrolidone, polyacrylonitrile, polyvinylalcohol and water-soluble cellulose. Such other binders are generally used in an amount of up to 15%, such as from 0.1 to 15%, for instance from 1 to 5%, by total weight of the comminuted foamed polymer, the nitrogen-containing fuel and the oxidiser.

Suitable burn rate modifiers include powdered metals or their corresponding alloys, oxides, salts or complexes. Examples of such modifiers include, for example aluminium, bismuth, calcium, copper, hafnium, iron, magnesium, strontium, tin, titanium, tungsten, zinc and zirconium. As noted above also included are their respective oxides, salts and complexes. The burn rate modifiers may be used individually, or in combination with one or more other burn rate modifiers. Potassium chromate, potassium dichromate, ammonium chromate and ammonium dichromate may also be used as burn rate modifiers and may be applied in the form of an aqueous solution to the surface of the oxidiser. The burn rate modifier may be present in amounts of up to 2%, such as from 0.1 to 2%, for instance from 0.5 to 1.5%, by total weight of the comminuted foamed polymer, the nitrogen-containing fuel and the oxidiser.

The gas-producing materials may also comprise an oxide-based catalyst comprising at least two members selected from the elements of Groups I, IV, V, VI, VII and VIII in the periodic table, such as cobalt molybdate or lead molybdate. Other useful oxide-based catalysts include salts of Li, Na, K, Rb, Cs, Ag, Cu, Sn, Pb, V, As, Sb, Bi, Fe or Ni of molybdic acid, chromic acid and/or tungstic acid. The oxide-based catalyst may be used in an amount of up to 20%, such as from 0.1 to 20%, for instance from 5 to 15%, by total weight of the comminuted foamed polymer, the nitrogen-containing fuel and the oxidiser.

Suitable flame inhibition chemicals include potassium chloride and monoammonium phosphate compounds. Such compounds may be present in amounts of up to 15%, such as from 0.1 to 15%, for instance from 5 to 10%, by total weight of the comminuted foamed polymer, the nitrogen-containing fuel and the oxidiser.

An anti-detonation component can also be used to prevent unwanted combustion of the gas-producing material. Suitable anti-detonation components include bentonite, alumina, silica, and diatomaceous earth. These components may be used in an amount of up to 20%, such as from 0.1 to 20%, for instance from 5 to 15%, by total weight of the comminuted foamed polymer, the nitrogen-containing fuel and the oxidiser.

The further components in total may be present in the gas-producing material in an amount of up to 40%, preferably up to 30% and more preferably up to 20%, by total weight of the comminuted foamed polymer, the nitrogen-containing fuel and the oxidiser.

In use the material of the present invention may be used in conjunction with known fire suppressant devices. The materials may also be used in conjunction with devices such as those disclosed in WO2013/108042 which discloses fire suppression panels.

In an alternative embodiment, the materials may also be used in the form of stand-alone charges, which when activated may be placed in the area of a fire for suppressant purposes. For the avoidance of any doubt, the charges may be used to suppress fully or partially a fire. The size of the charge can be selected according to the size of the fire and/or area in which suppression is required. In addition multiple charges may be used as and when required.

EXAMPLES

A series of measurements on the reaction smoke generated from three types of gas-producing material were conducted.

The three types of gas-producing material were:
A. "Prior Art Material with catalyst" comprising potassium nitrate, phenol-formaldehyde resin, toluenesulfonic acid, dicyandiamide
B. "Prior Art Material without catalyst" comprising Potassium Nitrate, phenol-formaldehyde resin, dicyandiamide
C. "Inventive Material" comprising: potassium nitrate, dicyandiamide, comminuted foamed phenol-formaldehyde resin The prior art materials are marketed by Villanova and sold as part of a product known as 'Firestryker'. The "Prior Art Material with catalyst" comprises, by total weight of the composition, potassium nitrate in an amount of 60%, phenol-formaldehyde resin in an amount of 13.73%, toluenesulfonic acid in an amount of 1.29%, dicyandiamide in an amount of 23.46% and water in an amount of 0.86%.

The evaluation of the reaction smoke generated from the three types of gas-producing material was carried out for a period of two hours inside a closed cabin of a volume of 7.7 $m^3$. For the "Prior Art Material without catalyst", three charges, each weighing 50 kg, were combusted over a period of two hours. The charges were ignited at intervals of 40 minutes, i.e. the first charge was ignited at the beginning of the two hour period, the second charge 40 minutes into the period, and the third charge an hour and twenty minutes into the period. For the "Prior Art Material with catalyst" and the "Inventive Material", four charges, each weighing 50 kg, were combusted over two hours. The charges were ignited at intervals of 30 minutes, i.e. the first charge was ignited at the beginning of the two hour period, the second charge 30 minutes into the period, the third charge an hour into the period, and the final charge an hour and a half into the period.

Measurement probes were located inside a small hole inside the cabin.

Measurements were taken on the following pollutants:
Combustion gas: CO, $NO_x$, $SO_x$ (like $SO_2$), $O_2$
Phenol
Formaldehyde
Ammonia
Total cyanide (Hydrogen cyanide and salt)
Hydrogen sulfide
Polynuclear aromatic hydrocarbons
Analytic Methods Measurements relating to the combustion gas pollutants were carried out for a period of 20 minutes after combustion of the first charge. All other measurements were carried out for the duration of the two hour period.

Combustion Gas: CO, $NO_x$, $SO_x$ (Like $SO_2$), $O_2$

The combustion parameters were measured continuously. A portable meter HORIBA with NDIR detection system was used for measuring CO and $SO_2$, chemiluminescence was used for measuring $NO_x$, and paramagnetism was used for measuring $O_2$ Total cyanide (hydrogen cyanide and salt)—UV-VIS—Inner Method (Rif. Met. Uff. MU 2251:2008+ISO 6703-2:1984)

Hydrogen cyanide measurements were conducted using NaOH water solutions as measuring supports. The NaOH solutions were contacted with pyridine and barbituric acid, and then analysed using US-VIS spectrophotometry at a wavelength of 578 nm.

Phenol—GC-MS—Met. Uff. NIOSH 2546 1994

Phenol measurements were conducted using XAD-7 solid sorbent tubes as measuring supports. The solid sorbent tubes were eluted with methanol. Analysis was carried out using a gas chromatography mass detection system.

Formaldehyde—HPLC-UV—Met. Uff. NIOSH 2016 1998

Formaldehyde measurements were conducted using cartridges containing silica gel coated with 2,4-dinitrophenylhydrazine as measurement supports. The cartridges were eluted with a solution of acetonitrile for HPLC. Analysis was carried out using liquid chromatography at high pressure (HPLC-UV) with a UV-VIS detecting system.

Polynuclear aromatic hydrocarbons—GC-MS—Met. Uff. NIOSH 5515 1994

Measurements were conducted using XAD-2 vials in series with glass fiber filters as measurement supports. The filters and vials were eluted in a hexane-acetone mixture. The obtained solutions were analyzed using a gas chromatography mass detection system.

Ammonia—UV-VIS—Met. Uff. NIOSH 6015 1994

Ammonia measurements were conducted using solid sorbent tubes with silica gel activated with sulfuric acid as measurement supports. The supports were eluted with a solution of ultrapure water. The obtained solutions were analyzed with UV-VIS spectrophotometry.

Hydrogen sulfide—IC—Met. Uff. NIOSH 6013 1994

Hydrogen sulfide measurements were conducted using solid sorbent tubes with coconut shells as measurement supports. The solid sorbent tube were eluted with a solution of NaOH. The obtained solution was analyzed using ionic chromatography.

A glass fiber filter was used for the measurements that require the use of a solid sorbent tube, so as to avoid the packing of the absorbent layer by particulate matter produced during combustion. The filter was also analysed.

Results

Combustion gas: CO, $NO_x$, $SO_x$ (like $SO_2$), $O_2$:

The measurements do not show any important differences between the combustion gases omitted by gas-producing materials. The combustion gases were produced in similar amounts by each material, except for NOx and CO which were produced in slightly slower amounts by the "Prior Art Material with catalyst".

|  |  | Sample | | |
|---|---|---|---|---|
|  |  | 12SP0234-002 | 12SP0234-023 | 12SP0234-034 |
|  |  | Typology | | |
|  |  | Prior Art Material without catalyst | Prior Art Material with catalyst Emission Date | Inventive Material |
| Parameter | U.M. | Feb. 17, 2012 Value | Feb. 17, 2012 Value | Feb. 17, 2012 Value |
| CO | mg/m3 | 100.5 | 86.9 | 108.3 |
| NOx (come NO2) | mg/m3 | 29.4 | 26.3 | 29.11 |
| O2 | % | 20.8 | 20.8 | 20.8 |
| SO2 | mg/m3 | 7.5 | 8.1 | 9.2 |

Phenol:

The "Prior Art Material without catalyst" produced less phenol on combustion than the other materials. The absence of a toluenesulfonic acid catalyst used for crosslinking of the phenol-formaldehyde resin during preparation of the "Prior Art Material without catalyst" meant that cross-linking was carried out for a longer time, thereby allowing unreacted phenol to disperse into the atmosphere. Thus, there is less phenol to be released on combustion of the "Prior Art Material without catalyst". As the resin in the "Inventive Material" is pre-foamed, the phenol has had some time to disperse from the foam into the atmosphere. Thus, the resin can be considered "old" in comparison to the resin used in the "Prior Art Material with catalyst".

|  |  | Sample | | |
|---|---|---|---|---|
|  |  | 12SP0234-002 | 12SP0234-023 | 12SP0234-034 |
|  |  | Typology | | |
|  |  | Prior Art Material without catalyst | Prior Art Material with catalyst Emission Date | Inventive Material |
| Parameter | U.M. | Feb. 15, 2012 Value | Feb. 21, 2012 Value | Feb. 21, 2012 Value |
| Phenol | mg/m3 | 0.066 | 31 | 4.8 |

Formaldehyde:

The formaldehyde values are low in each of the gas-producing materials.

|  |  | Sample | | |
|---|---|---|---|---|
|  |  | 12SP0234-006 | 12SP0234-024 | 12SP0234-035 |
|  |  | Typology | | |
|  |  | Prior Art Material without catalyst | Prior Art Material with catalyst Emission Date | Inventive Material |
| Parameter | U.M. | Feb. 15, 2012 Value | Feb. 21, 2012 Value | Feb. 21, 2012 Value |
| Formaldehyde | mg/m3 | <0.006 | <0.006 | <0.006 |

Ammonia:

The ammonia values are similar in the three types of material, taking into account the quantities of charges used for the test and the nature of the analyses.

|  |  | Sample | | |
|---|---|---|---|---|
|  |  | 12SP0234-003 | 12SP0234-021 | 12SP0234-019 |
|  |  | Typology | | |
|  |  | Prior Art Material without catalyst | Prior Art Material with catalyst Emission Date | Inventive Material |
| Parameter | U.M. | Feb. 15, 2012 Value | Feb. 21, 2012 Value | Feb. 21, 2012 Value |
| Ammonia | mg/m3 | 0.5173 | 1.03 | 1.77 |

Polynuclear Aromatic Hydrocarbons:

The results show that polynuclear aromatic hydrocarbons are produced from organic components in the materials during combustion. The "Inventive Material" generated, on average, smaller quantities of polynuclear aromatic hydrocarbons compared to the other two materials. Without wishing to be bound by any theory, it is believed that the smaller quantities measured could be as a result of the higher combustion temperature of the "Inventive Material" causing greater decomposition of the polynuclear aromatic hydrocarbons.

|  |  | Sample | | |
|---|---|---|---|---|
|  |  | 12SP0234-004 | 12SP0234-021 | 12SP0234-031 |
|  |  | Typology | | |
|  |  | Prior Art Material without catalyst | Prior Art Material with catalyst Emission Date | Inventive Material |
| Parameter | U.M. | Feb. 15, 2012 Value | Feb. 21, 2012 Value | Feb. 21, 2012 Value |
| Naphthalene | Ng/m3 | 786 | 16861 | 10180 |
| Acenaphthylene | Ng/m3 | 1099 | 6789 | 5837 |
| Acenaphthene | Ng/m3 | 292 | 58.3 | 257 |
| Fluorene | Ng/m3 | 484 | 1669 | 790 |
| Phenanthrene | Ng/m3 | 4054 | 14169 | 4940 |

-continued

| | | Sample | | |
|---|---|---|---|---|
| | | 12SP0234-004 | 12SP0234-021 | 12SP0234-031 |
| | | | Typology | |
| | | Prior Art Material without catalyst | Prior Art Material with catalyst | Inventive Material |
| | | | Emission Date | |
| Parameter | U.M. | Feb. 15, 2012 Value | Feb. 21, 2012 Value | Feb. 21, 2012 Value |
| Anthracene | Ng/m3 | 877 | 2494 | 820 |
| Fluoranthene | Ng/m3 | 1434 | 3269 | 1150 |
| Pyrene | Ng/m3 | 614 | 1267 | 533 |
| Benzo(a)anthracene | Ng/m3 | 801 | 1744 | 340 |
| Chrysene | Ng/m3 | 1386 | 2633 | 417 |
| Benzo(b)fluoranthene | Ng/m3 | 451 | 764 | 185 |
| Benzo(k)fluoranthene | Ng/m3 | 437 | 569 | 207 |
| Benzo(a)pyrene | Ng/m3 | 412 | 1392 | 453 |
| Benzo(e)pyrene | Ng/m3 | 376 | 828 | 263 |
| Perylene | Ng/m3 | 43.3 | 103 | 23.3 |
| Indeno(1,2,3-cd)pyrene | Ng/m3 | 94.4 | 133 | 33.3 |
| Dibenz(a,h)anthracene | Ng/m3 | 141 | 211 | 36.7 |
| Benzo(g,h,i)perylene | Ng/m3 | 274 | 408 | 61.7 |
| Dibenz(a,l)pyrene | Ng/m3 | 83.3 | 283 | 40 |
| Dibenz(a,e)pyrene | Ng/m3 | 82.2 | 161 | 25.3 |
| Dibenz(a,i)pyrene | Ng/m3 | 45 | 150 | 20.7 |
| Dibenz(a.i)pyrene | Ng/m3 | 25.6 | 72.2 | 18 |

Hydrogen Sulphide:

The "Prior Art Material without catalyst" produced a minor amount of hydrogen sulfide ($H_2S$), very likely due to the absence of toluenesulfonic acid used as a catalyst. The "Inventive Material" produced more hydrogen sulphide than the "Prior Art Material with catalyst". This is somewhat expected from given the relative amounts of sulphur present in the mixtures before combustion, shown below along with the amounts of certain other components.

| | | Sample | | |
|---|---|---|---|---|
| | | 12SP0234-005 | 12SP0234-020 | 12SP0234-030 |
| | | | Typology | |
| | | Prior Art Material without catalyst | Prior Art Material with catalyst | Inventive Material |
| | | | Emission Date | |
| Parameter | U.M. | Feb. 15, 2012 Value | Feb. 21, 2012 Value | Feb. 21, 2012 Value |
| Hydrogen sulfide (H2S) | mg/m3 | 0.394 | 1.096 | 1.841 |

| | | | Sample | | |
|---|---|---|---|---|---|
| | | | 12SP0234-016 | 12SP0234-017 | 12SP0234-018 |
| | | | | Typology | |
| | | | Prior Art Material without catalyst | Prior Art Material with catalyst | Inventive Material |
| | | | | Emission Date | |
| Parameter | U.M. | Limit | Feb. 21, 2012 Value | Feb. 21, 2012 Value | Feb. 21, 2012 Value |
| Total Bromine | % | — | <0.01 | <0.01 | <0.01 |
| Total Chlorine | % | — | 0.09 | 0.16 | 0.11 |

-continued

| | | | Sample | | |
|---|---|---|---|---|---|
| | | | 12SP0234-016 | 12SP0234-017 | 12SP0234-018 |
| | | | | Typology | |
| | | | Prior Art Material without catalyst | Prior Art Material with catalyst | Inventive Material |
| | | | | Emission Date | |
| Parameter | U.M. | Limit | Feb. 21, 2012 Value | Feb. 21, 2012 Value | Feb. 21, 2012 Value |
| Total Fluorine | % | — | 0.01 | 0.02 | 0.02 |
| Total Iodine | % | — | <0.01 | <0.01 | <0.01 |
| Total Sulphur | % | — | 0.02 | 0.1 | 0.35 |

Total Cyanide (Hydrogen Cyanide and Salt):

A large difference can be seen between the cyanide produced on combustion of the "Inventive Material" and the prior art materials. The "Inventive Material" emits an amount of cyanide that is over ten times smaller than that emitted by the prior art materials, thereby allowing a much greater amount of gas-producing material to be used per unit of confined space. Without wishing to be bound by any theory, it is believed that small value observed in connection with the "Inventive Material" could be attributable to a higher temperature of combustion i.e. over 1000° C. versus less than 800° C.

| | | Sample | | |
|---|---|---|---|---|
| | | 12SP0234-007 | 12SP0234-019 | 12SP0234-019 |
| | | | Typology | |
| | | Prior Art Material without catalyst | Prior Art Material with catalyst | Inventive Material |
| | | | Emission Date | |
| Parameter | U.M. | Feb. 15, 2012 Value | Feb. 21, 2012 Value | Feb. 21, 2012 Value |
| Total Cyanide (HCN and Salt) | mg/m3 | 76.7 | 48.4 | 3.16 |

As can be seen from the experimental evidence, the gas-producing materials are suitable for suppressing fire, particularly in confined spaces where the potential accumulation of unwanted by-products can be harmful to humans. The results also show that the use of a comminuted foamed polymer leads to a reduction in cyanide emissions from a gas-producing material comprising a nitrogen-containing fuel and an oxidiser.

The invention claimed is:

1. A method of forming a gas-producing material, the method comprising comminuting a foamed polymer to form a comminuted foamed polymer and combining the comminuted foamed polymer with water, a nitrogen-containing fuel, and an oxidiser to form a paste.

2. The method of claim 1, wherein the foamed polymer is selected from at least one member of a group consisting of phenolic resin foams, polystyrene foams, polyurethane foams, polyethylene foams, polyvinylchloride foams, polyvinylacetate foams, polyester foams polyether foams, and foam rubber.

3. The method of claim 1, wherein the foamed polymer has an average cell diameter of from 0.5 to 5 mm.

4. The method of claim 1, wherein the foamed polymer is open-cell.

5. The method of claim 1, wherein the comminuted foamed polymer has an average particle size in the range from of 1 to 200 μm.

6. The method of claim 1, wherein the method further comprises forming the foamed polymer by a curing reaction between:
(a) a liquid resole; and
(b) an acid hardener for the resole.

7. The method of claim 6, wherein an insoluble particulate solid is present in the curing reaction in an amount of at least 5% by weight of the liquid resole.

8. The method of claim 6, wherein the method further comprises forming the resole by condensation of at least one phenolic compound with at least one aldehyde.

9. The method of claim 6, wherein the acid hardener is p-toluene sulfonic acid.

10. The method of claim 1, wherein the nitrogen-containing fuel is selected from at least one member of a group consisting of guanidine salts, triazoles and tetrazole, and azo-compounds.

11. The method of claim 1, wherein the nitrogen-containing fuel is in the form of particles with an average particle size in the range of from 5 to 150 μm.

12. The method of claim 1, wherein the oxidiser is selected from at least one member of a group consisting of alkali metal nitrates, perchlorates, and carbonates.

13. The method of claim 1, wherein the oxidiser is in the form of particles with an average particle size in the range of from 1 to 100 μm.

14. The method of claim 1, wherein the method comprises combining:
the comminuted foamed polymer in an amount of 8 to 20%;
the nitrogen-containing fuel in an amount of 19 to 29%; and
the oxidiser in an amount of 55 to 69%,
by total weight of the comminuted foamed polymer, the nitrogen-containing fuel, and the oxidiser.

15. The method of claim 1, wherein water is added in an amount of 1 to 100% by total weight of the comminuted foamed polymer, the nitrogen-containing fuel, and the oxidiser.

16. The method of claim 1, wherein the method comprises combining water with the comminuted foamed polymer and subsequently combining the water and the comminuted foamed polymer with the nitrogen-containing fuel and the oxidiser.

17. The method of claim 1, wherein the method comprises drying the paste.

18. The method of claim 17, wherein the method includes drying the paste to contain water in an amount of from 1 to 40% by total weight of the comminuted foamed polymer, the nitrogen-containing fuel, and the oxidiser.

19. The method of claim 17, wherein the drying is carried out at a temperature of from 25 to 110° C.

20. The method of claim 1, wherein the method comprises introducing further components into the gas-producing material, the further components being selected from at least one member of a group consisting of binders, burn rate modifiers, flame inhibition chemicals and additional oxidizing agents.

21. The method of claim 20, wherein the further components in total are present in the gas-producing material in an amount of up to 50% by total weight of the comminuted foamed polymer, the nitrogen-containing fuel, and the oxidiser.

* * * * *